United States Patent
Ito et al.

(10) Patent No.: US 7,585,120 B2
(45) Date of Patent: Sep. 8, 2009

(54) OPTICAL DEVICE AND METHOD OF MANUFACTURING THE SAME, OPTICAL DEVICE ADAPTOR, AND OPTICAL COMPONENT STOPPER

(75) Inventors: Makoto Ito, Yamanashi (JP); Sosaku Sawada, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 0 days.

(21) Appl. No.: 11/362,792

(22) Filed: Feb. 28, 2006

(65) Prior Publication Data

US 2006/0193568 A1  Aug. 31, 2006

(30) Foreign Application Priority Data

Feb. 28, 2005  (JP) ............... 2005-054438

(51) Int. Cl.
*G02B 6/36* (2006.01)
*G02B 6/26* (2006.01)
*G02B 6/42* (2006.01)

(52) U.S. Cl. .......................... 385/93; 385/50
(58) Field of Classification Search ............ 385/88–94, 385/50

See application file for complete search history.

(56) References Cited

U.S. PATENT DOCUMENTS

| | | | | |
|---|---|---|---|---|
| 5,039,193 A * | 8/1991 | Snow et al. | .................... | 385/25 |
| 5,315,680 A * | 5/1994 | Musk et al. | .................... | 385/88 |
| 5,542,018 A * | 7/1996 | Kuhara et al. | ................. | 385/92 |
| 5,555,334 A * | 9/1996 | Ohnishi et al. | ................ | 385/93 |
| 5,586,208 A * | 12/1996 | Nishiyama | .................... | 385/93 |
| 5,768,458 A * | 6/1998 | Ro et al. | ....................... | 385/79 |
| 5,841,923 A * | 11/1998 | Kyoya | .......................... | 385/93 |
| 5,883,748 A * | 3/1999 | Shum | .......................... | 359/819 |
| 5,963,694 A * | 10/1999 | Fujimura et al. | .............. | 385/88 |
| 6,106,160 A * | 8/2000 | Kikuchi et al. | ................. | 385/88 |
| 6,179,483 B1 * | 1/2001 | Kanazawa | .................... | 385/93 |
| 6,409,398 B2 * | 6/2002 | Nakaya et al. | ................. | 385/93 |
| 6,538,901 B1 * | 3/2003 | Hung | ......................... | 361/806 |
| 6,694,077 B2 * | 2/2004 | Liu et al. | ....................... | 385/33 |
| 6,748,143 B2 * | 6/2004 | Kuhara et al. | ................. | 385/49 |
| 6,749,347 B1 * | 6/2004 | Ichihara et al. | ............... | 385/93 |
| 6,799,901 B2 * | 10/2004 | Yoshimura et al. | ............ | 385/88 |
| 6,804,436 B2 * | 10/2004 | Healy | ........................... | 385/33 |
| 6,893,170 B1 * | 5/2005 | Edwards et al. | ............... | 385/93 |
| 6,953,290 B2 * | 10/2005 | Nakanishi et al. | ............. | 385/93 |
| 6,963,680 B2 * | 11/2005 | Lempkowski et al. | ........ | 385/26 |
| 6,964,529 B2 * | 11/2005 | Chien | .......................... | 385/88 |
| 7,059,780 B2 * | 6/2006 | Yamabayashi et al. | ........ | 385/88 |

(Continued)

FOREIGN PATENT DOCUMENTS

JP  60-138506  7/1985

*Primary Examiner*—Uyen Chau N Le
*Assistant Examiner*—Rhonda S Peace
(74) *Attorney, Agent, or Firm*—Kratz, Quintos & Hanson, LLP (57) ABSTRACT

An optical device includes: a first optical component that has an end face oblique with respect to a plane perpendicular to an optical axis; a second optical component that is optically coupled to the first optical component; and a lens that is placed between the first optical component and the second optical component, and is positioned so that the trajectory of a focal point formed when the first optical component and the second optical component rotate relative to each other falls within a valid region on the surface of the second optical component.

16 Claims, 4 Drawing Sheets

U.S. PATENT DOCUMENTS

| | | | |
|---|---|---|---|
| 2001/0048794 A1* | 12/2001 | Nakaya et al. | 385/93 |
| 2001/0055451 A1* | 12/2001 | Kuhara et al. | 385/93 |
| 2002/0114593 A1* | 8/2002 | Terada et al. | 385/93 |
| 2003/0118283 A1* | 6/2003 | Healy | 385/33 |
| 2003/0180010 A1* | 9/2003 | Minamino et al. | 385/92 |
| 2004/0141699 A1* | 7/2004 | Sato | 385/93 |
| 2004/0184744 A1* | 9/2004 | Uekawa | 385/93 |
| 2004/0258368 A1* | 12/2004 | Luo et al. | 385/93 |
| 2004/0258369 A1* | 12/2004 | Luo et al. | 385/93 |
| 2005/0175295 A1* | 8/2005 | Ozeki et al. | 385/89 |
| 2006/0285805 A1* | 12/2006 | Healy | 385/92 |

* cited by examiner

OPTICAL DEVICE AND METHOD OF MANUFACTURING THE SAME, OPTICAL DEVICE ADAPTOR, AND OPTICAL COMPONENT STOPPER

BACKGROUND OF THE INVENTION

1. Field of the Invention

The present invention generally relates to an optical device, a method of manufacturing the optical device, an optical device adaptor, and an optical component stopper, and more particularly, to an optical device that has two optical components coupled to each other with a lens, a method of manufacturing such an optical device, an adaptor for such an optical device, and an optical component stopper.

2. Description of the Related Art

In recent years, optical devices have been widely used in the fields of optical communications and household appliances. An example of such optical devices is a device that has two optical components coupled to each other with a lens. Japanese Unexamined Patent Publication No. 60-138506 discloses a light receiving module (hereinafter referred to as the "prior art") as an optical device that has an optical fiber and a light receiving element coupled to each other with a lens (see FIG. 3 of the document). So as to prevent light reflection from the end face of an optical fiber, the prior art includes an optical fiber (a first optical component) that an the end face oblique with respect to a plane perpendicular to an optical axis, a light receiving element (a second optical component) that receives light emitted from the optical fiber, and a lens that is placed between the optical fiber and the light receiving element so that the light emitted from the optical fiber is focused on the light receiving element. The light receiving face of the light receiving element is oblique with respect to the plane perpendicular to the optical axis. This is to prevent the light emitted from the optical fiber from being reflected by the light receiving face of the light receiving element and returning to the optical fiber.

In the prior art, however, the inclination of the end face of the optical fiber, or the rotational angle of the optical fiber with respect to the optical axis, needs to be precisely adjusted so as to maintain invariable coupling between the optical fiber and the light receiving element. The rotational angle of the optical component to which the optical fiber is attached is determined by the rotational angle of the optical fiber. As a result, the degree of freedom is reduced in terms of design. Furthermore, precise assembling needs to be performed so as to determine the rotational angle of the optical fiber, resulting in an increase in production cost.

SUMMARY OF THE INVENTION

It is therefore an object of the present invention to provide an optical device, a method of manufacturing the optical device, an optical device adaptor, and an optical component stopper in which the above disadvantages are eliminated.

A more specific object of the present invention is to provide an optical device that allows a high degree of freedom in design, is easy to assemble, and restricts an increase in production cost. Other specific objects of the present invention are to provide a method of manufacturing such an optical device, to provide an adaptor for such an optical device, and to provide an optical component stopper.

According to an aspect of the present invention, there is provided an optical device including: a first optical component that has an end face oblique with respect to a plane perpendicular to an optical axis; a second optical component that is optically coupled to the first optical component; and a lens that is placed between the first optical component and the second optical component, and is positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device that has a high degree of freedom in design, is easy to assemble, and restricts an increase in production cost can be provided.

According to another aspect of the present invention, there is provided a method of manufacturing an optical device, including the steps of: placing a first optical component that has an end face oblique to a plane perpendicular to an optical axis, a second optical component that is optically coupled to the first optical component, and a lens between the first optical component and the second component; determining positions of the first optical component, the second optical component, and the lens, so that a trajectory of a focal point formed when the first optical component and the second optical component rotate relative to each other falls within a valid region on a surface of the second optical component, the positions being relative to one another; and securing the relative positions of the first optical component, the second optical component, and the lens. In accordance with the present invention, the optical coupling does not change even when the rotation of the first optical component and the second optical component rotate relative to each other. Therefore, it is not necessary to determine the rotational angles of the first optical component and the second optical component. Thus, a method of manufacturing an optical device that allows a high degree of freedom in design, is easy to assemble, and restricts an increase in production cost can be provided.

According to yet another aspect of the present invention, there is provided an optical device adaptor including: a housing member that accommodates a first optical component with an end face oblique with respect to a plane perpendicular to an optical axis; and a lens that is placed between a region in which the first optical component is to be placed and a region in which a second optical component to be optically coupled to the first optical component is to be placed, the lens being positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device adaptor that allows a high degree of freedom in design, is easy to assemble, and restricts an increase in production cost can be provided.

According to a further aspect of the present invention, there is provided an optical device including: a housing member that accommodates a first optical component with an end face oblique with respect to a plane perpendicular to an optical axis; a second optical component that is optically coupled to the first optical component; and a lens that is placed between a region in which the first optical component is to be placed and a region in which the second optical component is to be placed, and is positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device that allows a high degree of freedom in design, is easy to assemble, and restricts an increase in production cost can be provided.

According to a still further aspect of the present invention, there is provided a method of manufacturing an optical device, including the steps of: placing a first optical component that has an end face oblique to a plane perpendicular to an optical axis, a second optical component that is optically coupled to the first optical component, and a lens between the first optical component and the second component; determining positions of the second optical component and the lens, so that a trajectory of a focal point formed when the first optical component and the second optical component rotate relative to each other falls within a valid region on a surface of the second optical component, the positions being relative to each other; and securing the relative positions of the second optical component and the lens. In accordance with the present invention, the optical coupling does not change even when the rotation of the first optical component and the second optical component rotate relative to each other. Therefore, it is not necessary to determine the rotational angles of the first optical component and the second optical component. Thus, a method of manufacturing an optical device that allows a high degree of freedom in design, is easy to assemble, and restricts an increase in production cost can be provided.

According to another aspect of the present invention, there is provided an optical component stopper including: a through hole through which an optical axis extends; and an oblique face that is located outside of the optical axis, and can be in contact with an end face of a first optical component that is oblique with respect to a plane perpendicular to the optical axis, the end face being brought into contact with the oblique face so as to determine positions of the first optical component, a second optical component, and a lens, so that a trajectory of a focal point formed when the first optical component and the second optical component rotate relative to each other falls within a valid region on a surface of the second optical component, the positions being relative to one another. In accordance with the present invention, the optical coupling does not change even when the rotation of the first optical component and the second optical component rotate relative to each other. Therefore, it is not necessary to determine the rotational angles of the first optical component and the second optical component. Thus, an optical component stopper that allows a high degree of freedom in design, is easy to assemble, and restricts an increase in production cost can be provided.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
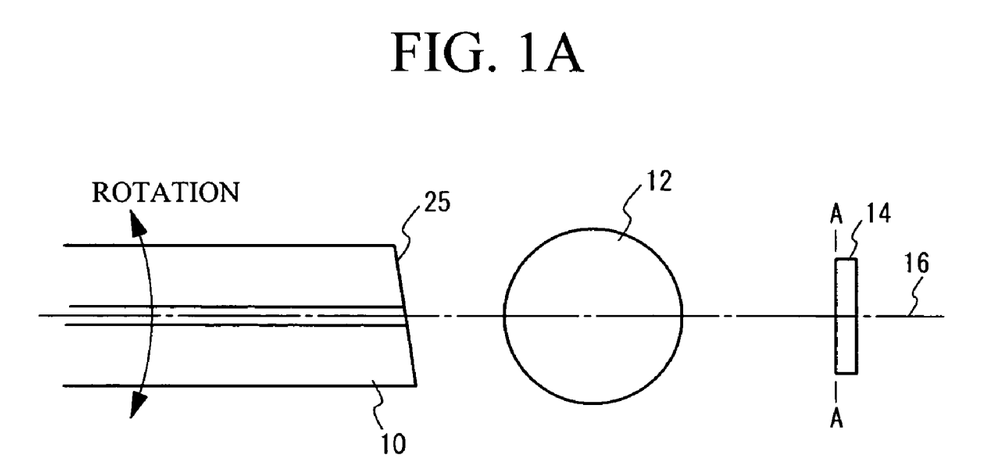
FIGS. 1A and 1B schematically illustrate the principles of the present invention.
Figure 1B:
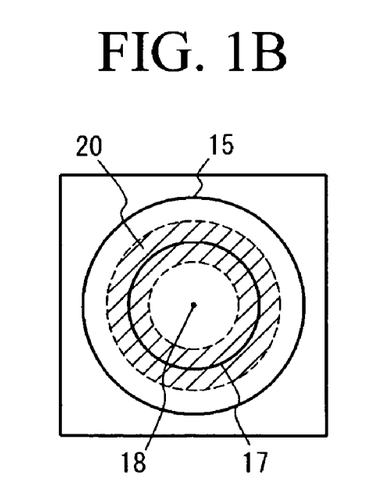

FIGS. 1A and 1B are schematic views illustrating the principles of the present invention. FIG. 1A is a schematic view of a structure in accordance with the present invention. This structure includes a first optical component (a ferrule, for example) 10 that has an end face 25 oblique with respect to a plane perpendicular to an optical axis 16, a second optical component (a light receiving element or a light emitting element) 14 that is optically coupled to the first optical component 10, and a lens 12 that is provided between the first optical component 10 and the second optical component 14. If the end face 25 is formed in parallel with the plane vertical to the optical axis 16 and the second optical component 14 is a light receiving element, light emitted from the first optical component 10 is reflected by the surface of the light receiving element, and returns to the first optical component 10. So as to prevent the light from return to the first optical component 10, the end face 25 is obliquely formed.

FIG. 1B shows the location of the focal point in the A-A plane on the surface of the second optical component 14. Here, the "focal point" is a point formed in the vicinity of the surface of the second optical component 14 by the light emitted or entering from the first optical component 10 through the lens 12. Reference numeral 18 indicates the center point of a valid region 15 on the surface of the second optical component 14. The valid region 15 is the region in which causes the second optical component 14 to function properly. More specifically, if the second optical component 14 is a light receiving element, the valid region 15 serves as a light receiving face for obtaining a predetermined photosensitivity. If the second optical component 14 is a light emitting element, the valid region 15 serves as a light emitting face for obtaining a predetermined light emission intensity.

In the prior art, the focal point is a predetermined point on the second optical component 14 to be optically coupled to the first optical component 10. Therefore, the rotational angle about the center axis 16 of the first optical component 10 needs to be exactly determined.

In the present invention, on the other hand, the lens 12 is positioned so that the trajectory of the focal point is located within the valid region 15 on the surface of the second optical component 14 in a case where the first optical component 10 rotates on the center axis 16 (or where the first optical component 10 rotates relative to the second optical component 14). In this manner, the focal point formed on the surface of the second optical component 14 always falls within the valid region 15 on the surface of the second optical component 14, even if the first optical component 10 rotates on the center axis 16 (or if the first optical component 10 rotates relative to the second optical component 14). Accordingly, invariable optical coupling can be achieved between the first optical component 10 and the second optical component 14, regardless of the rotational angle of the first optical component 10.

The location of the focal point formed in the valid region 15 is preferably at a predetermined distance from the center 18 of a concentric region 20 shown in FIG. 1B, which is the center 18 of the valid region 15, and is also preferably at a predetermined distance from the periphery of the valid region 15. This is because, when the rotation of the first optical component 10 causes the trajectory 17 of the focal point to form a circle having the center 18 of the valid region 15 as its center, the probability of the focal point deviating from the valid region 15 is minimized. Also, if the second optical component 14 is a light receiving element or a light emitting element, the photosensitivity or the light emission intensity often exhibits a concentric distribution. Accordingly, the photosensitivity or the light emission intensity hardly varies with the rotation of the first optical component 10.

The rotation of the first optical component 10 and the second optical component 14 relative to each other may be the rotation about the center axis 16 of the first optical component 10 as shown in FIG. 1A, the rotation about the center axis of the second optical component 14, or a combination of the rotation about the center axis 16 of the first optical component 10 and the rotation about the center axis of the second optical component 14, or a complicated combined rotation of the first optical component 10 and the second optical component 14. In any case, invariable optical coupling can be achieved, as long as the lens 12 is positioned so that the trajectory of the focal point formed through the rotation stays in the valid region 15 on the surface of the second optical component 14. In the example illustrated in FIGS. 1A and 1B, the optical axis 16 is the same as the center axis 16 of the first optical component 10 (the same applies in the following embodiments). However, the optical axis is not necessarily the same as the center axis.

First Embodiment

Figure 2:
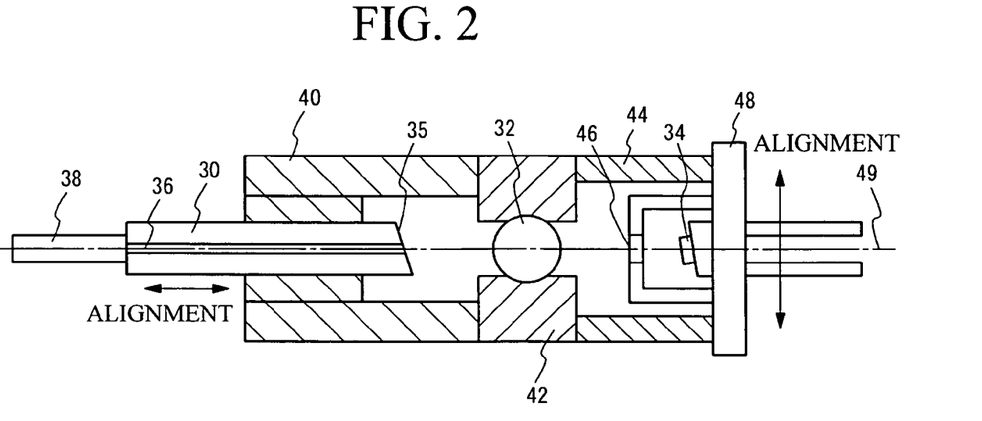
FIG. 2 is a schematic cross-sectional view of a first embodiment of the present invention.

An optical device in accordance with a first embodiment of the present invention includes a ferrule 30 (a first optical component) that has an optical fiber core 36 therein and an end face 35 oblique with respect to a plane perpendicular to an optical axis 49, a light receiving element 34 (a second optical component) that is optically coupled to the ferrule 30 and has a surface oblique with respect to the plane perpendicular to the optical axis 49, and a lens 32. These components are integrally secured in the optical device. FIG. 2 is a cross-sectional view of the first embodiment. The ferrule 30 connected to an optical fiber 38 has the optical fiber core 36 therein. The lens 32 is positioned between the ferrule 30 (the first optical component) and the light receiving element 34 (the second optical component), so that the trajectory of the focal point formed by the ferrule 30 (the first optical component) rotating on the center axis 49 (the rotation of the first optical component and the second optical component relative to each other) always falls within the valid region on the surface of the light receiving element 34 (the second optical component).

The ferrule 30 and the lens 32 are secured to a ferrule holder 40 and a lens holder 42, respectively. The light receiving element 34 is mounted in a light receiving element package 48 that has a window 46 through which light enters. The light receiving element 34 is mounted obliquely with respect to a plane perpendicular to the optical axis (not shown) extending from the ferrule 30 via the lens 32, so as to prevent light reflected by the light receiving element 34 from reaching the optical fiber core 36. The light receiving element package 48 is fixed to the light receiving element holder 44. The ferrule holder 40 (the first optical component), the lens holder 42, and the light receiving element holder 44 (the second optical component) are integrally secured in the device.

Figure 3:
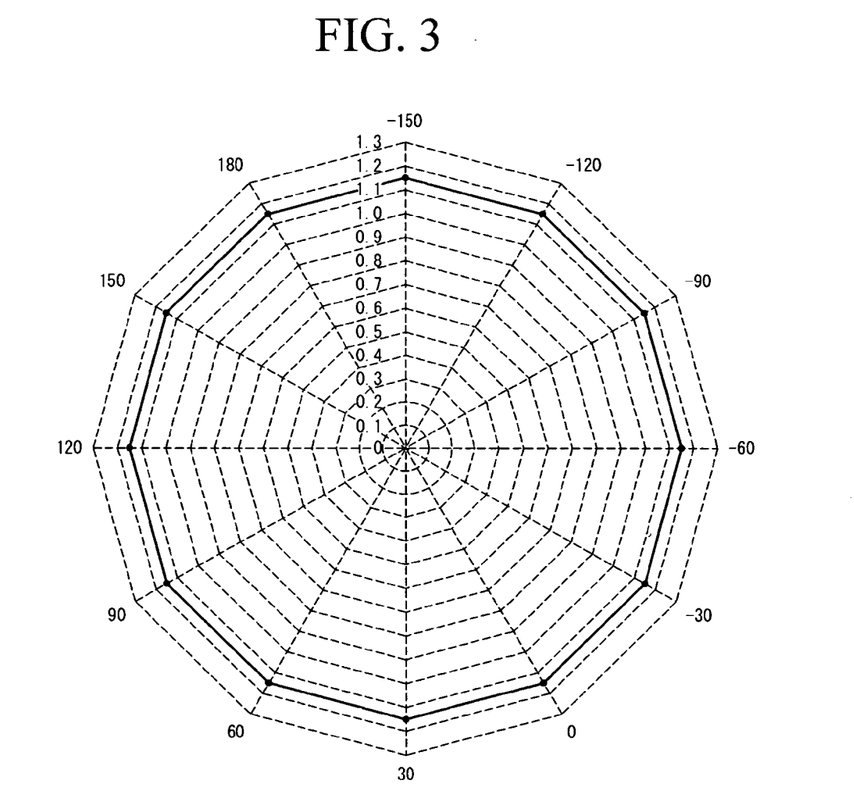
FIG. 3 shows the output of the light receiving element when the ferrule rotates on the center axis in the optical device of the first embodiment.
Figure 4:
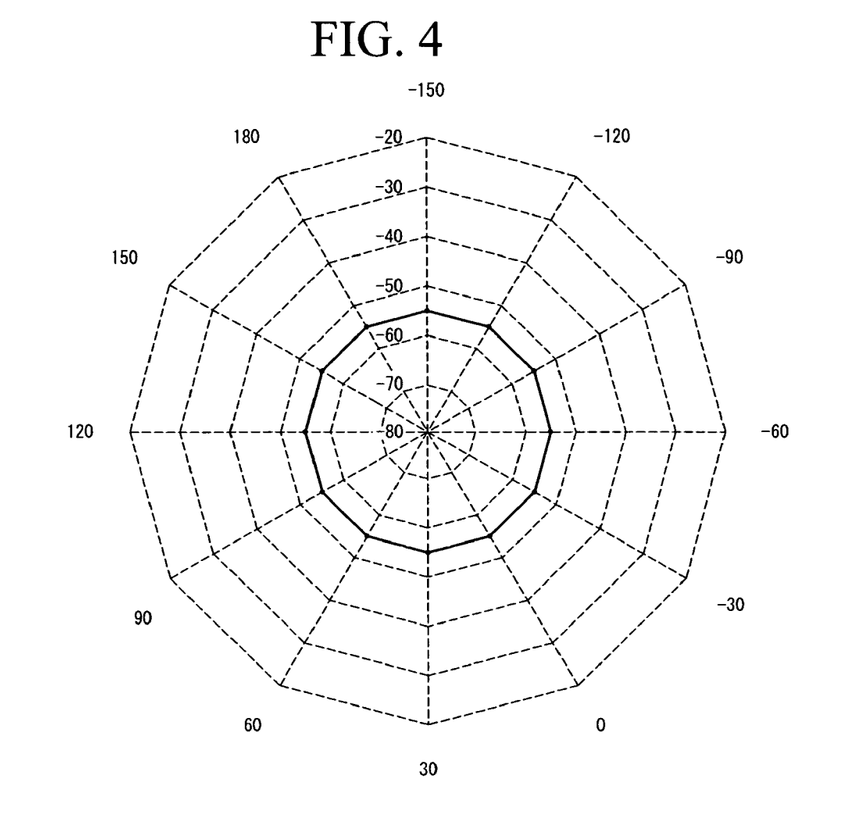
FIG. 4 shows the intensity of the reflected light returning to the ferrule when the ferrule rotates on the center axis in the optical device of the first embodiment.

In the first embodiment, the lens 32 is positioned so that the trajectory of the focal point formed by the ferrule 30 (the first optical component) rotating on the center axis 49 (or by the rotation of the first optical component and the second optical component relative to each other) always falls on the surface of the light receiving element 34. FIG. 3 shows the output of the light receiving element 34 when the ferrule 30 rotates on the center axis 49. In FIG. 3, the circumferential direction indicates the rotational angle of the ferrule 30 rotating on the optical axis 49, and the radial direction indicates the output of the light receiving element 34. Even if the ferrule 30 rotates, the output of the light receiving element 34 is invariable. FIG. 4 shows the intensity of the reflected light returning to the ferrule 30 when the ferrule 30 rotates on the center axis 49. Like the output of the light receiving element 34 (see FIG. 3), the intensity of the reflected light does not seem to vary with the rotational angle. As is apparent from the above facts, the optical device of the first embodiment achieves invariable optical coupling, regardless of the rotational angle of the ferrule 30.

Even if the relative rotational angle of the ferrule 30 with respect to the light receiving element 34 changes with time after the completion of the assembly process of the optical device of the first embodiment, a change in optical coupling can be restricted. Thus, an optical device with high long-term reliability can be realized. Furthermore, the relative rotational angle of the ferrule 30 with respect to the light receiving element 34 is set in an arbitrarily manner. Accordingly, the relative rotational angle of the ferrule 30 with respect to the light receiving element 34 does not need to be taken into consideration at the stage of designing the device. Thus, a high degree of freedom is allowed in design.

Next, a method of manufacturing the optical device of the first embodiment is described. First, the ferrule holder 40, the lens holder 42, and the light receiving element holder 44 are welded and secured with a YAG laser, for example. The lens 32 is then placed between the ferrule 30 (the first optical component) and the light receiving element 34 (the second optical component).

The location of the lens 32 relative to the ferrule 30 (the first optical component) and the light receiving element 34 (the second optical component) is determined so that the trajectory of the focal point formed by the ferrule 30 (the first optical component) rotating on the center axis 49 (or by the rotation of the first optical component and the second optical component relative to each other) always falls within the valid region on the surface of the light receiving element 34 (the second optical component). Here, the relative location is determined by adjusting the location of the ferrule 30 (the first optical component) in the direction of the center axis 49 of the rotation relative to the ferrule holder 40, and adjusting the location of the light receiving element package 48 having the light receiving element 34 (the second optical component) mounted therein in a direction perpendicular to the center axis 49 of the rotation relative to the light receiving element holder 44 (see the directions indicated by the arrows in FIG. 2). Also, the light receiving element 34 (the second optical component) is placed so that a surface of the light receiving element 34 is positioned obliquely with respect to a plane perpendicular to the optical axis.

Using a YAG laser, for example, the ferrule 30 (the first optical component) is then welded and secured in the ferrule holder 40, and the light receiving element package 48 in which the light receiving element 34 (the second optical component) is mounted is welded and secured in the light receiving element holder 44. Accordingly, the ferrule 30 (the first optical component), the light receiving element 34 (the second optical component), and the lens 32 are secured at the above described relative locations.

In the prior art, the rotational angle with respect to the center axis 49 of the ferrule 30 and the light receiving element 34 needs to be precisely adjusted during the manufacturing process. In the first embodiment, on the other hand, invariable optical coupling can be achieved, regardless of the rotational angle with respect to the center axis of the ferrule 30 and the light receiving element 34. Accordingly, it is not necessary to adjust the rotational angle with precision. Thus, the assembling process is simplified, and the production costs can be lowered.

Although the lens 32 is held in the lens holder 42 in the first embodiment, it may be held in place of the window 46 in the light receiving element package 48 (the second optical component).

Second Embodiment

Figure 5:
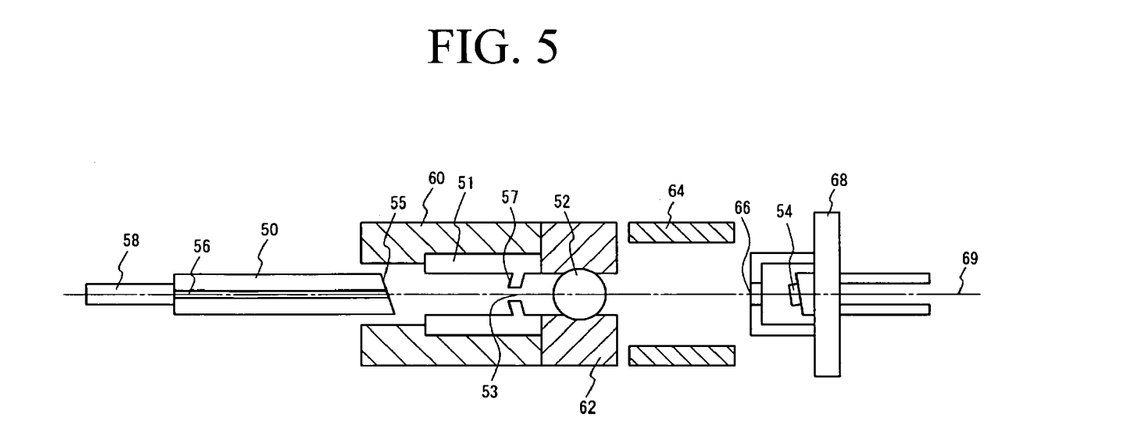
FIG. 5 is a schematic cross-sectional view of a second embodiment of the present invention.

A second embodiment of the present invention is an optical device adaptor. FIG. 5 is a cross-sectional view of the second embodiment. The optical device adaptor of this embodiment includes a lens holder 62 into which a lens 52 is secured, and an adaptor housing 60 into which a stopper 51 is secured. The lens holder 62 and the adaptor housing 60 are secured with respect to each other. The optical device adaptor has the lens 52 and the stopper 51 that is a housing member to accommodate the ferrule 50 (the first optical component) having an end face 55 oblique with respect to a plane perpendicular to an optical axis 69. The stopper 51 (the housing member) has a through hole 53 through which the optical axis 69 passes, and an oblique face 57 that is located outside the optical axis 69 and can be in contact with the oblique end face 55 of the ferrule 50 (the first optical component). The oblique face 57 is at a wide angle with respect to the direction of the optical axis 69 extending from the ferrule 50 (the first optical component) to the light receiving element 54 (the second optical component).

Meanwhile, the ferrule 50 (the first optical component) is connected to an optical fiber 58, and has an optical fiber core 56 therein and the end face 55 oblique with respect to the plane perpendicular to the optical axis 69. The end face 55 includes an end face of the optical fiber core 56. The ferrule 50 is fixed to a connector housing (not shown) so as to form a connector plug (not shown). The connector plug has a mechanism to be engaged with the optical device adaptor of the second embodiment. As the connector plug is engaged with the optical device adaptor, the ferrule 50 is inserted to the stopper 51, and the end face 55 of the ferrule 50 (the first optical component) is brought into contact with the oblique face 57 of the stopper 51, thereby positioning the ferrule 50.

The light receiving element 54 (the second optical component) is mounted in the light receiving element package 68, and a window 66 through which light enters is formed in the light receiving element package 68. The light receiving element package 68 is secured to the light receiving element holder 64. The light receiving element holder 64 is secured to the optical device adaptor of the second embodiment for actual use.

As the connector plug is engaged with the optical device adaptor, the ferrule 50 is introduced to a predetermined position in the stopper 51. With the light receiving element holder 64 being secured to the optical device adaptor, the lens 52 is positioned so that the trajectory of the focal point formed by the ferrule 50 rotating on the center axis 69 (or by the rotation of the first optical component and the second optical component relative to each other) always falls within the valid region on the surface of the light receiving element 54. More specifically, the lens 52 is placed between the region in which the ferrule 50 (the first optical component) is to be placed and the region in which the light receiving element 54 (the second optical component) optically coupled to the ferrule 50 (the first optical component) is to be placed. The lens 52 is then positioned so that the trajectory of the focal point formed by the ferrule 50 (the first optical component) rotating on the center axis 69 (or by the rotation of the first optical component and the second optical component relative to each other) always falls within the valid region on the surface of the light receiving element 54 (the second optical component).

In the above described optical device adaptor of the second embodiment, invariable optical coupling is achieved even if the connector plug containing the ferrule 50 rotates relative to the optical device adaptor. If a conventional connector plug containing a ferrule rotates, a change is caused in the resultant optical coupling. Therefore, a protrusion (a "key") is formed in the conventional connector plug, and is engaged with an engaging portion of an optical device adaptor, so as to prevent the rotation of the connector plug relative to the optical device adaptor. If the key is broken, such a connector plug becomes unusable. In the second embodiment, on the other hand, a key is not required, because the optical coupling does not change even when the connector plug rotates. Thus, the undesirable situation in which the connector plug becomes unusable due to damage to the key can be avoided. However, the optical device adaptor of the second embodiment can be of course connected to a connector plug having a key.

When the light receiving element holder 64 is incorporated into the optical device adaptor, the relative location in between can be determined, regardless of the rotational angle of the light receiving element holder 64 rotating on the center axis 69. Thus, the number of procedures for assembling can be reduced, and the production cost can be lowered.

The stopper 51 of the ferrule 50 (the first optical component) has the through hole 53 through which the optical axis 69 passes, and the oblique face 57 that is located outside the optical axis 69 and can be in contact with the oblique end face 55 of the ferrule 50 (the first optical component). The oblique face 57 is at a wide angle with respect to the direction of the optical axis 69 extending from the ferrule 50 to the light receiving element 54. Accordingly, as the end face 55 of the ferrule 50 (the first optical component) is brought into contact with the oblique face 57 of the stopper 51, the contact between the ferrule 50 and the stopper 51 is not point contact, but at least line contact. Thus, damage to the end face 55 of the ferrule 50 can be prevented.

With the end face 55 being in contact with the oblique face 57 of the stopper 51, the location of the lens 52 relative to the ferrule 50 (the first optical component) and the light receiving element 54 (the second optical component) can be determined so that the trajectory of the focal point formed by the ferrule 50 (the first optical component) rotating on the center axis 69 (or by the rotation of the first optical component and the second optical component relative to each other) always falls within the valid region on the surface of the light receiving element 54 (the second optical component) optically coupled to the ferrule 50 (the first optical component). Thus, invariable optical coupling can be maintained between the ferrule 50 and the light receiving element 54.

The optical device formed by attaching the light receiving element 54 (the second optical component) to the optical device adaptor of the second embodiment includes the stopper 51 (the housing member) that accommodates the ferrule 50 (the first optical component) with the end face 55 oblique with respect to the plane perpendicular to the optical axis 69, and the light receiving element 54 (the second optical component) optically coupled to the ferrule 50 (the first optical component). This optical device also includes the lens 52 that is placed between the predetermined location at which the ferrule 50 is inserted to the stopper 51 (or the ferrule 50 should be placed) and the light receiving element 54, and is positioned so that the trajectory of the focal point formed by the ferrule 50 (the first optical component) rotating on the center axis 69 (or by the rotation of the first optical component and the second optical component relative to each other) always falls within the valid region on the surface of the light receiving element 54 (the second optical component). In this optical device, invariable optical coupling can be achieved, and the same effects as the effects of the second embodiment can be achieved, even if the connector plug containing the ferrule 50 rotates relative to the optical device adaptor.

Next, a method of manufacturing this optical device is described. The lens holder 62 having the stopper 51 and the lens 52 secured thereto is fixed to an adaptor holder 60 through welding with a YAG laser, for example. The light receiving element package 68 in which the light receiving element 54 is mounted is then secured to the light receiving element holder 64. The connector plug to which the ferrule 50 is secured is connected to the adaptor having the adaptor holder 60. In this manner, the ferrule 50 (the first optical component) is placed in a position defined by the stopper 51 or in a predetermined region in which the ferrule 50 should be placed. The lens 52 is then placed between the ferrule 50 (the first optical component) and the light receiving element 54 (the second optical component). The location of the lens 52 relative to the ferrule 50 (the first optical component) and the light receiving element 54 (the second optical component) is determined so that the trajectory of the focal point formed by the ferrule 50 (the first optical component) rotating on the center axis 69 (or by the rotation of the first optical component and the second optical component relative to each other) always falls within the valid region on the surface of the light receiving element 54 (the second optical component). Lastly, the relative locations of the light receiving element 54 (the second optical component) and the lens 52 are set through welding with a YAG laser, for example.

The relative locations are set through adjustment only in the direction of the center axis 69 of rotation and in a direction perpendicular to the center axis 69 of rotation. The light receiving element 54 is secured so that a surface of the light receiving element 54 is oblique with respect to a plane perpendicular to the optical axis 69.

Although the lens 52 is secured in the lens holder 62 in the second embodiment, it may be secured in the adaptor housing 60.

Third Embodiment

Figure 6:
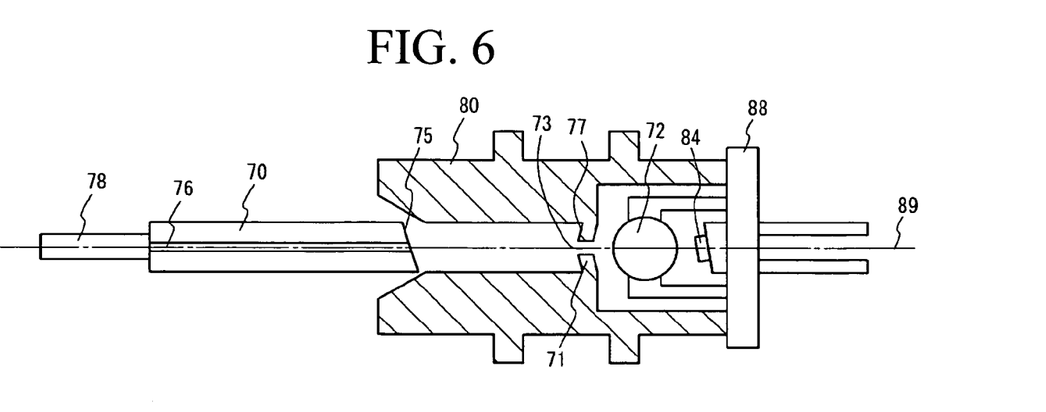
FIG. 6 is a schematic cross-sectional view of a third embodiment of the present invention.

A third embodiment of the present invention is a structure in which an optical device adaptor serves as a sleeve, and a lens is contained in a light receiving element package. FIG. 6 is a cross-sectional view of the third embodiment. The optical device adaptor of this embodiment includes a sleeve 80 that also serves as a housing member to accommodate a ferrule 70 (a first optical component) having an end face 75 oblique with respect to a plane perpendicular to an optical axis 89. The sleeve 80 has a stopper 71, and a light receiving element package 88 having a lens 72 is fixed to the sleeve 80. The stopper 71 is a sleeve to accommodate the ferrule 70 (the first optical component). A light receiving element 84 is mounted in the light receiving element package 88, and has a face oblique with respect to the plane perpendicular to the optical axis 89.

The stopper 71 has a through hole 73 through which the optical axis 89 passes, and an oblique face 77 that is located outside the optical axis 89 and can be in contact with the oblique end face 75 of the ferrule 70 (the first optical component). The oblique face 77 is at a wide angle with respect to the direction of the optical axis 89 extending from the ferrule 70 to the light receiving element 84.

Meanwhile, the ferrule 70 is connected to an optical fiber 78, and has an optical fiber core 76 therein and the end face 75 oblique with respect to the plane perpendicular to the optical axis 79. The end face 75 includes an end face of the optical fiber core 76. The ferrule 70 is fixed to a connector housing (not shown) so as to form a connector plug (not shown). The connector plug has a mechanism to be engaged with the optical device adaptor of the third embodiment. As the connector plug is engaged with the optical device adaptor, the ferrule 70 is inserted to the stopper 71, and the end face 75 of the ferrule 70 is brought into contact with the oblique face 77 of the stopper 71, thereby positioning the ferrule 70.

As the connector plug is engaged with the optical device adaptor, the ferrule 70 is introduced to a predetermined position in the stopper 71. With the end face 75 being in contact with the oblique face 77 by virtue of the stopper 71, the location of the lens 72 relative to the ferrule 70 (the first optical component) and the light receiving element 84 (the second optical component) is determined so that the trajectory of the focal point formed by the ferrule 70 (the first optical component) rotating on the center axis 89 (or by the rotation of the first optical component and the second optical component relative to each other) always falls within the valid region on the surface of the light receiving element 84 (the second optical component) optically coupled to the ferrule 70 (the first optical component). Thus, invariable optical coupling can be maintained between the ferrule 70 and the light receiving element 84.

With this structure, invariable optical coupling can be achieved even if the connector plug containing the ferrule 70 rotates relative to the optical device adaptor of the third embodiment. The adaptor of the third embodiment may be incorporated into part of a communication device, and be used as an input port for optical communications, for example. In the prior art, the connector plug needs to have a "key" for restricting the rotation of the ferrule, as described in Second Embodiment. With the key, the optical fiber might unnaturally twist when an optical communication device is put in position. In the third embodiment, on the other hand, the ferrule 70 can freely rotate, and twisting of the optical fiber 78 is prevented.

Fourth Embodiment

Figure 7:
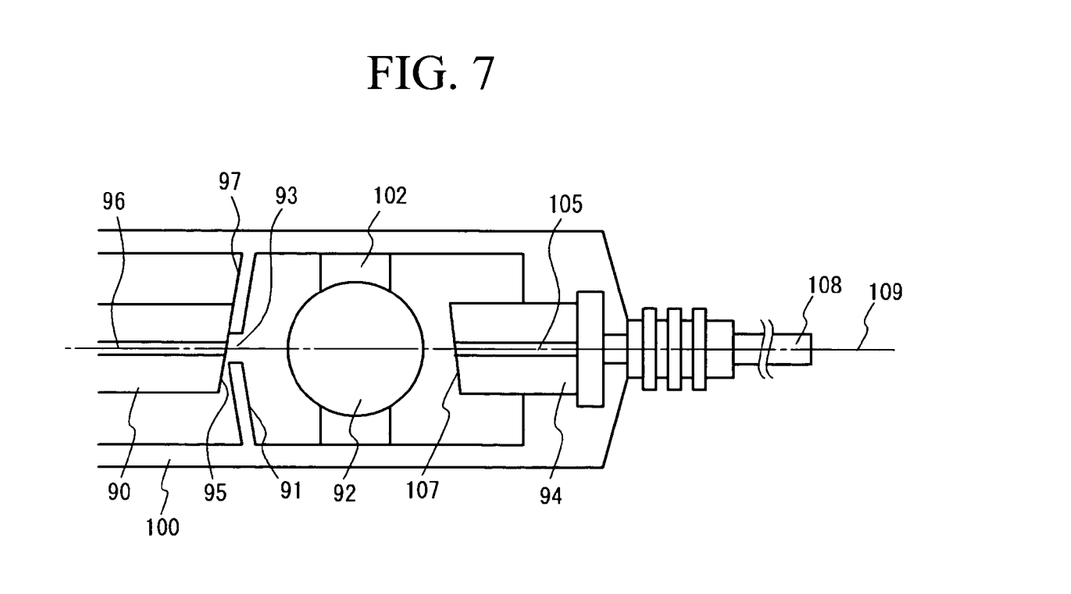
FIG. 7 is a schematic cross-sectional view of a fourth embodiment of the present invention.

A fourth embodiment of the present invention is an optical fiber adaptor that has a first optical component and a second optical component both serving as a ferrule. FIG. 7 is a cross-sectional view of the fourth embodiment. An adaptor housing 100 includes a stopper 91 having an oblique face 97, a lens holder 102 to which a lens 92 is secured, and a ferrule 94 (the second optical component). The ferrule 94 has an end face 107 oblique with respect to a plane perpendicular to an optical axis 109. The ferrule 94 is connected to an optical fiber 108, and has an optical fiber core 105 therein. The adaptor housing 100 further includes a housing member (not shown)

to accommodate a ferrule 90 (the first optical component). The ferrule 90 (the first optical component) has an end face 95 oblique with respect to the plane perpendicular to the optical axis 109. The ferrule 90 is connected to an optical fiber (not shown), and has an optical fiber core 96 therein. The ferrule 90 is secured in a connector housing (not shown) so as to form a connector plug (not shown). The connector plug is engaged with an optical device adaptor. The lens 92 is positioned so that the trajectory of the focal point formed by the ferrule 90 rotating on the center axis 109 (or by the rotation of the first optical component and the second optical component relative to each other) always falls within the valid region on the surface of the ferrule 94.

In the fourth embodiment, invariable optical coupling that does not vary with the rotation of the connector plug can also be achieved in an optical device adaptor for connecting optical fibers.

Although the preferred embodiments of the present invention have been described so far, the present invention is not limited to the specific examples described above. Rather, various changes and modifications may be made to them, without departing from the scope of the invention. For example, a ferrule is used as the first optical component in the above described embodiments, but any type of passive optical component, light receiving element, or light emitting element, such as a lens or a filter, may be employed as the first optical component, as long as it has an end face that is oblique with respect to a plane perpendicular to the optical axis. Also, a light receiving element or a ferrule is used as the second embodiment in the above described embodiments. Instead, a light emitting element such as a multi-mode fiber or a vertical cavity surface emitting laser (VCSEL) may be employed as the second optical component, as long as it can be coupled to the first optical component and has a valid region for the focal point to be formed by the rotation of the first optical component and the second optical component relative to each other.

The present invention described above can be summarized as follows.

According to an aspect of the present invention, there is provided an optical device including: a first optical component that has an end face oblique with respect to a plane perpendicular to an optical axis; a second optical component that is optically coupled to the first optical component; and a lens that is placed between the first optical component and the second optical component, and is positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device that has a high degree of freedom in design, is easy to assemble, and restricts an increase in production cost can be provided.

The optical device may be configured so that the surface of the second optical component is oblique with respect to the plane perpendicular to the optical axis. In accordance with the present invention, the light reflected by the surface of the second optical component can be prevented from entering the first optical component.

The optical device may be configured so that the lens is held by one of a lens holder and the second optical component.

The optical device may be configured so that the first optical component includes a ferrule that has an optical fiber core therein and also has an end face that is oblique with respect to the plane perpendicular to the optical axis.

According to another aspect of the present invention, there is provided a method of manufacturing an optical device, including the steps of: placing a first optical component that has an end face oblique to a plane perpendicular to an optical axis, a second optical component that is optically coupled to the first optical component, and a lens between the first optical component and the second component; determining positions of the first optical component, the second optical component, and the lens, so that a trajectory of a focal point formed when the first optical component and the second optical component rotate relative to each other falls within a valid region on a surface of the second optical component, the positions being relative to one another; and securing the relative positions of the first optical component, the second optical component, and the lens. In accordance with the present invention, the optical coupling does not change even when the rotation of the first optical component and the second optical component rotate relative to each other. Therefore, it is not necessary to determine the rotational angles of the first optical component and the second optical component. Thus, a method of manufacturing an optical device that allows a high degree of freedom in design, is easy to assemble, and restricts an increase in production cost can be provided.

The method may be configured so that the step of determining positions includes determining the relative positions only with respect to a direction of a center axis of the relative rotation and a direction perpendicular to the direction of the center axis of the relative rotation. In accordance with the present invention, it is not necessary to determine the relative position in the direction of rotation. Thus, an increase in production cost can be prevented.

The method may be configured so that the step of determining positions includes placing the second optical component so that the surface thereof is oblique with respect to the plane perpendicular to the optical axis. In accordance with the present invention, the light reflected by the surface of the second optical component can be prevented from entering the first optical component.

The method may be configured so that the first optical component includes a ferrule that has an optical fiber core therein and also has an end face oblique with respect to the plane perpendicular to the optical axis.

According to yet another aspect of the present invention, there is provided an optical device adaptor including: a housing member that accommodates a first optical component with an end face oblique with respect to a plane perpendicular to an optical axis; and a lens that is placed between a region in which the first optical component is to be placed and a region in which a second optical component to be optically coupled to the first optical component is to be placed, the lens being positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device adaptor that allows a high degree of freedom in design, is easy to assemble, and restricts an increase in production cost can be provided.

The optical device adaptor may be configured so that the housing member includes a stopper that has a through hole through which the optical axis extends, and an oblique face that is located outside of the optical axis and can be in contact with the oblique end face of the first optical component. In accordance with the present invention, the positions of the first optical component and the second optical component can be precisely determined by virtue of the stopper. Thus, an optical device adaptor in which the end face of the first optical component is not damaged can be provided.

The optical device adaptor may be configured so that, with the second optical component or a member holding the second optical component being fixed to the optical device adaptor, a relative position of the lens is determined so that the trajectory of the focal point formed when the first optical component and the second optical component rotate relative to each other falls within the valid region on the surface of the second optical component.

The optical device adaptor may be configured so that the first optical component includes a ferrule that has an optical fiber core therein and also an end face oblique with respect to the plane perpendicular to the optical axis.

According to a further aspect of the present invention, there is provided an optical device including: a housing member that accommodates a first optical component with an end face oblique with respect to a plane perpendicular to an optical axis; a second optical component that is optically coupled to the first optical component; and a lens that is placed between a region in which the first optical component is to be placed and a region in which the second optical component is to be placed, and is positioned so that a trajectory of a focal point formed when the first optical component and the second optical component rotate relative to each other falls within a valid region on a surface of the second optical component. In accordance with the present invention, the optical coupling does not change even when the rotation of the first optical component and the second optical component rotate relative to each other. Therefore, it is not necessary to determine the rotational angles of the first optical component and the second optical component. Thus, an optical device that allows a high degree of freedom in design, is easy to assemble, and restricts an increase in production cost can be provided.

The optical device may be configured so that the housing member includes a stopper that has a through hole through which the optical axis extends, and an oblique face that is located outside of the optical axis and can be in contact with the oblique end face of the first optical component. In accordance with the present invention, the positions of the first optical component and the second optical component can be precisely determined by virtue of the stopper. Thus, an optical device in which the end face of the first optical component is not damaged can be provided.

The optical device as may be configured so that the surface of the second optical component is oblique with respect to the plane perpendicular to the optical axis. In accordance with the present invention, the light reflected by the surface of the second optical component can be prevented from entering the first optical component.

The optical device may be configured so that the first optical component includes a ferrule that has an optical fiber core therein and also has an end face oblique with respect to the plane perpendicular to the optical axis.

According to a still further aspect of the present invention, there is provided a method of manufacturing an optical device, including the steps of: placing a first optical component that has an end face oblique to a plane perpendicular to an optical axis, a second optical component that is optically coupled to the first optical component, and a lens between the first optical component and the second component; determining positions of the second optical component and the lens, so that a trajectory of a focal point formed when the first optical component and the second optical component rotate relative to each other falls within a valid region on a surface of the second optical component, the positions being relative to each other; and securing the relative positions of the second optical component and the lens. In accordance with the present invention, the optical coupling does not change even when the rotation of the first optical component and the second optical component rotate relative to each other. Therefore, it is not necessary to determine the rotational angles of the first optical component and the second optical component. Thus, a method of manufacturing an optical device that allows a high degree of freedom in design, is easy to assemble, and restricts an increase in production cost can be provided.

The method may be configured so that the step of determining positions includes determining the relative positions only with respect to a direction of a center axis of the relative rotation and a direction perpendicular to the direction of the center axis of the relative rotation. In accordance with the present invention, it is not necessary to determine the relative position in the direction of rotation. Thus, an increase in production cost can be prevented.

The method may be configured so that the step of determining positions includes placing the second optical component so that the surface thereof is oblique with respect to the plane perpendicular to the optical axis. In accordance with the present invention, the light reflected by the surface of the second optical component can be prevented from entering the first optical component.

The method may be configured so that the first optical component includes a ferrule that has an optical fiber core therein and also has an end face oblique with respect to the plane perpendicular to the optical axis.

According to another aspect of the present invention, there is provided an optical component stopper including: a through hole through which an optical axis extends; and an oblique face that is located outside of the optical axis, and can be in contact with an end face of a first optical component that is oblique with respect to a plane perpendicular to the optical axis, the end face being brought into contact with the oblique face so as to determine positions of the first optical component, a second optical component, and a lens, so that a trajectory of a focal point formed when the first optical component and the second optical component rotate relative to each other falls within a valid region on a surface of the second optical component, the positions being relative to one another. In accordance with the present invention, the optical coupling does not change even when the rotation of the first optical component and the second optical component rotate relative to each other. Therefore, it is not necessary to determine the rotational angles of the first optical component and the second optical component. Thus, an optical component stopper that allows a high degree of freedom in design, is easy to assemble, and restricts an increase in production cost can be provided.

The optical component stopper may be configured so that the oblique face is at a wide angle with respect to a direction of the optical axis extending from the second optical component to the first optical component.

The optical component stopper may be configured so that: the first optical component includes a ferrule that has an optical fiber core therein and also has an end face oblique with respect to the plane perpendicular to the optical axis; and the oblique end face of the first optical component includes an end face of the optical fiber core.

The optical component stopper may be configured so that the stopper is a sleeve that houses the first optical component.

In accordance with the present invention, the lens is positioned so that the trajectory of a focal point formed when the first optical component and the second optical component rotate relative to each other falls within the valid region on the surface of the second optical component. Therefore, it is not necessary to determine the rotational angles of the first optical component and the second optical component. Thus, an optical device, a method of manufacturing an optical device, an optical device adaptor, and an optical component stopper that allow a high degree of freedom in design, are easy to assemble, and restrict an increase in production cost can be provided.

The present invention is not limited to the specifically disclosed embodiments, but various variations and modifications may be made without departing from the scope of the present invention as claimed.

The present invention is based on Japanese Patent Application No. 2005-054438 filed on Feb. 28, 2005, the entire disclosure of which is hereby incorporated by reference.

What is claimed is:

1. An optical device comprising:
a first optical component that includes a ferrule that has an optical fiber core therein and an end face oblique with respect to a plane perpendicular to an optical axis;
a second optical component that is optically coupled to the first optical component;
a lens that is placed between the first optical component and the sea rid optical component, and is positioned so that a trajectory of a focal point formed when the first optical component and the second optical component rotate relative to each other falls within a valid region on a surface of the second optical component and the optical coupling does not change; and
a housing member that accommodates the first optical component and that includes a stopper that has a through hole through which the optical axis extends, an oblique face that is located outside of the optical axis and is in at least line contact with the oblique end face of the ferrule so that the ferrule and the stopper rotate relative to each other and maintain the at least line contact,
wherein said first and second optical components rotate relative to each other by one of:
rotation of the first optical component about a center axis thereof,
rotation of the second optical component about a center axis thereof, and
a combination of rotation of the first optical component about the center axis thereof and rotation of the second optical component about the center axis thereof.

2. The optical device as claimed in claim 1, wherein the surface of the second optical component is oblique with respect to the plane perpendicular to the optical axis.

3. The optical device as claimed in claim 1, wherein the lens is held by one of a lens holder and a package of the second optical component.

4. A method of manufacturing an optical device, comprising the steps of:
placing a first optical component that includes a ferrule that has an optical fiber core therein and an end face oblique to a plane perpendicular to an optical axis, a second optical component that is optically coupled to the first optical component, and a lens between the first optical component and the second component the first optical component being accommodated by a housing member that includes a stopper that has a through hole through which the optical axis extends, an oblique face that is located outside of the optical axis and is in at least line contact with the oblique end face of the ferrule so that the ferrule and the stopper rotate relative to each other and maintain the at least line contact;
determining positions of the first optical component, the second optical component, and the lens, so that a trajectory of a focal point formed when the first optical component and the second optical component rotate relative to each other falls within a valid region on a surface of the second optical component and the optical coupling does not change, the positions being relative to one another; and
securing the relative positions of the first optical component, the second optical component, and the lens, wherein said first and second optical components rotate relative to each other by one of:
rotation of the first optical component about a center axis thereof,
rotation of the second optical component about a center axis thereof; and
a combination of rotation of the first optical component about the center axis thereof and rotation of the second optical component about the center axis thereof.

5. The method as claimed in claim 4, wherein the step of determining positions includes determining the relative positions only with respect to a direction of the center axis of the relative rotation and a direction perpendicular to the direction of the center axis of the relative rotation.

6. The method as claimed in claim 4, wherein the step of determining positions includes placing the second optical component so that the surface thereof is oblique with respect to the plane perpendicular to the optical axis.

7. An optical device adaptor comprising:
a housing member that accommodates a first optical component that includes a ferrule that has an optical fiber core therein and an end face oblique with respect to a plane perpendicular to an optical axis, the housing member that includes a stopper that has a through hole through which the optical axis extends, an oblique face that is located outside of the optical axis and is in at least line contact with the oblique end face of the ferrule so that the ferrule and the stopper rotate relative to each other and maintain the at least line contact; and
a lens that is placed between a region in which the first optical component is to be placed and a region in which a second optical component to be optically coupled to the first optical component is to be placed, the lens being positioned so that a trajectory of a focal point formed when the first optical component and the second optical component rotate relative to each other falls within a valid region on a surface of the second optical component and the optical coupling does not change, wherein said first and second optical components rotate relative to each other by one of:
rotation of the first optical component about a center axis thereof,
rotation of the second optical component about a center axis thereof; and
a combination of rotation of the first optical component about the center axis thereof and rotation of the second optical component about the center axis thereof.

8. The optical device adaptor as claimed in claim 7, wherein, with the second optical component or a member holding the second optical component being fixed to the optical device adaptor, a relative position of the lens is determined so that the trajectory of the focal point formed when the first optical component and the second optical component rotate relative to each other falls within the valid region on the surface of the second optical component.

9. An optical device comprising:
a housing member that accommodates a first optical component that includes a ferrule that has an optical fiber core therein and an end face oblique with respect to a plane perpendicular to an optical axis, the housing member that includes a stopper that has a through hole through which the optical axis extends, an oblique face that is located outside of the optical axis and is in at least line contact with the oblique end face of the ferrule so that the ferrule and the stopper rotate relative to each other and maintain the at least line contact;
a second optical component that is optically coupled to the first optical component; and
a lens that is placed between a region in which the first optical component is to be placed and a region in which the second optical component is to be placed, and is positioned so that a trajectory of a focal point formed when the first optical component and the second optical component rotate relative to each other falls within a valid region on a surface of the second optical component and the optical coupling does not change, wherein said first and second optical components rotate relative to each other by one of:
rotation of the first optical component about a center axis thereof,
rotation of the second optical component about a center axis thereof; and
a combination of rotation of the first optical component about the center axis thereof and rotation of the second optical component about the center axis thereof.

10. The optical device as claimed in claim 9, wherein the surface of the second optical component is oblique with respect to the plane perpendicular to the optical axis.

11. A method of manufacturing an optical device, comprising the steps of:
placing a flint optical component that includes a ferrule that has an optical fiber core therein and an end face oblique to a plane perpendicular to an optical axis, a second optical component that is optically coupled to the first optical component, and a lens between the first optical component and the second component, the first optical component being accommodated by a housing member that includes a stopper that has a through hole trough which the optical axis extends, an oblique face that is located outside of the optical axis and is in at least line contact with the oblique end face of the ferrule so that the ferrule and the stopper rotate relative to each other a ad maintain the at least line contact;
determining positions of the second optical component and the lens, so that a trajectory of a focal point formed when the first optical component and the second optical component rotate relative to each other falls within a valid region on a surface of the second optical component and the optical coupling does not change, the positions being relative to each other; and
securing the relative positions of the second optical component and the lens, wherein said first and second optical components rotate relative to each other by one of:
rotation of the first optical component about a center axis thereof,
rotation of the second optical component about a center axis thereof; and
a combination of rotation of the first optical component about the center axis thereof and rotation of the second optical component about the center axis thereof.

12. The method as claimed in claim 11, wherein the step of determining positions includes determining the relative positions only with respect to a direction of the center axis of the relative rotation and a direction perpendicular to the direction of the center axis of the relative rotation.

13. The method as claimed in claim 11, wherein the step of determining positions includes placing the second optical component so that the surface thereof is oblique with respect to the plane perpendicular to the optical axis.

14. An optical component stopper comprising:
a through hole through which an optical axis extends; and
an oblique face that is located outside of the optical axis, and is in at least line contact with an end face of a ferrule included in a first optical component that is oblique with respect to a plane perpendicular to the optical axis so that the ferrule and the optical component stopper rotate relative to each other and maintain the at least line contact,
the end face being brought into contact with the oblique face so as to determine positions of the first optical component, a second optical component, and a lens, so that a trajectory of a focal point formed when the first optical component and the second optical component rotate relative to each other falls within a valid region on a surface of the second optical component and the optical coupling does not change, the positions being relative to one another, wherein said first and second optical components rotate relative to each other by one of:
rotation of the first optical component about a center axis thereof,
rotation of the second optical component about a center axis thereof, and
a combination of rotation of the first optical component about the center axis thereof and rotation of the second optical component about the center axis thereof.

15. The optical component stopper as claimed in claim 14, wherein the oblique face is at a wide angle with respect to a direction of the optical axis extending from the first optical component to the second optical component.

16. The optical component stopper as claimed in claim 14, wherein the stopper is a sleeve that houses the first optical component.

* * * * *